(12) United States Patent
Sai Ananthanarayanan et al.

(10) Patent No.: US 9,215,752 B2
(45) Date of Patent: Dec. 15, 2015

(54) ELECTRONIC DEVICE WITH THROUGH-DISPLAY NEAR FIELD COMMUNICATION CAPABILITY

(71) Applicant: MOTOROLA MOBILITY LLC, Libertyville, IL (US)

(72) Inventors: Peruvemba Raganathan Sai Ananthanarayanan, Naperville, IL (US); Vijay L. Asrani, Round Lake, IL (US); Katherine H. Coles, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 208 days.

(21) Appl. No.: 13/946,099

(22) Filed: Jul. 19, 2013

(65) Prior Publication Data

US 2014/0256377 A1 Sep. 11, 2014

Related U.S. Application Data

(60) Provisional application No. 61/775,999, filed on Mar. 11, 2013.

(51) Int. Cl.
*H04W 88/06* (2009.01)
*H01Q 1/44* (2006.01)
(Continued)

(52) U.S. Cl.
CPC ............... *H04W 88/06* (2013.01); *H01Q 1/243* (2013.01); *H01Q 1/38* (2013.01); *H01Q 1/44* (2013.01); *H01Q 1/521* (2013.01); *H01Q 7/08* (2013.01)

(58) Field of Classification Search
CPC ........... H01Q 7/00; H01Q 1/243; H01Q 1/38; H01Q 1/526; H01Q 13/106; H01Q 1/44; H01Q 21/28; H01M 2/1066; H01M 1/0277; H04L 63/0492; H04L 63/18; H04W 12/06; H04W 84/18
USPC ................ 455/78, 575.1, 557, 41.2; 343/702; 345/156, 501
See application file for complete search history.

(56) References Cited

U.S. PATENT DOCUMENTS 8,099,045 B2    1/2012 Chang
2004/0196182 A1* 10/2004 Unnold .................... 342/357.07
(Continued)

FOREIGN PATENT DOCUMENTS

CA         2788962 A1    3/2013

OTHER PUBLICATIONS

Patent Cooperation Treaty, International Search Report and Written Opinion of the International Searching Authority for International Application No. PCT/US2014/016381, Apr. 28, 2014, 12 pages.
(Continued)

*Primary Examiner* — Nizar Sivji
(74) *Attorney, Agent, or Firm* — Shumaker & Sieffert, P.A.

(57) ABSTRACT

An electronic device (200) includes a control circuit (304) disposed on a substrate (220). The control circuit is operable with a display (509), a near field communication circuit (201) and a wide area communication circuit (302). The near field communication circuit is operable with a near field communication circuit antenna (344). The wide area communication circuit is operable with one or more wide area communication circuit antennas (312). In a housing (511) of the electronic device, the substrate separates the near field communication antenna from the battery and the wide area network communication antenna.

12 Claims, 9 Drawing Sheets

(51) Int. Cl.
*H01Q 1/24* (2006.01)
*H01Q 1/38* (2006.01)
*H01Q 1/52* (2006.01)
*H01Q 7/08* (2006.01)

(56) References Cited

U.S. PATENT DOCUMENTS

| | | | |
|---|---|---|---|
| 2004/0203488 A1* | 10/2004 | Sullivan et al. | 455/90.1 |
| 2007/0247373 A1 | 10/2007 | Egorov | |
| 2009/0231210 A1 | 9/2009 | Sotoudeh | |
| 2010/0315389 A1 | 12/2010 | Sorrell et al. | |
| 2011/0028091 A1* | 2/2011 | Higgins et al. | 455/41.2 |
| 2012/0162028 A1 | 6/2012 | Kubo et al. | |
| 2012/0196652 A1* | 8/2012 | Lee et al. | 455/557 |
| 2012/0287003 A1 | 11/2012 | Kao et al. | |
| 2014/0070919 A1* | 3/2014 | Jackson et al. | 340/5.61 |
| 2014/0106684 A1* | 4/2014 | Burns et al. | 455/78 |

OTHER PUBLICATIONS

International Search Report and Written Opinion of international application No. PCT/US2014/016381, dated Apr. 28, 2014, 12 pgs.

International Preliminary Report on Patentability from International Application No. PCT/US2014/016381, mailed Sep. 24, 2015, 9 pages.

* cited by examiner

ELECTRONIC DEVICE WITH THROUGH-DISPLAY NEAR FIELD COMMUNICATION CAPABILITY

BACKGROUND

1. Technical Field

This disclosure relates generally to electronic devices, and more particularly to electronic devices with near field communication capabilities.

2. Background Art

Electronic devices configured for communication, such as mobile telephones, tablet computers, and radios, each use antennas to transmit and receive radio-frequency communication signals. These antennas communicate with networks to transmit and receive data. The antennas allow the device to be truly wireless, in that all communication may occur over the air.

While once large, retractable devices, the antennas found on most common communication devices are quite small today. For example, at one time a mobile telephone was a relatively large device with a long, floppy, protruding antenna. Due to advances in technology, modern mobile telephones are slimmer and lighter. Antenna design has advanced to the point that many modern mobile telephones do not include protruding antennas at all. They rather rely upon internal antenna structures for communication with networks. The use of internal antennas has allowed designers and engineers to create sleeker and more fashionable products.

At the same time, the number of networks with which an electronic device must communicate has increased. This has increased the complexity of the circuitry of electronic devices, as well as the number of antennas required to communicate with the various networks. It would be advantageous to have an electronic device with simplified circuits without sacrificing device functionality.

Figure 1:
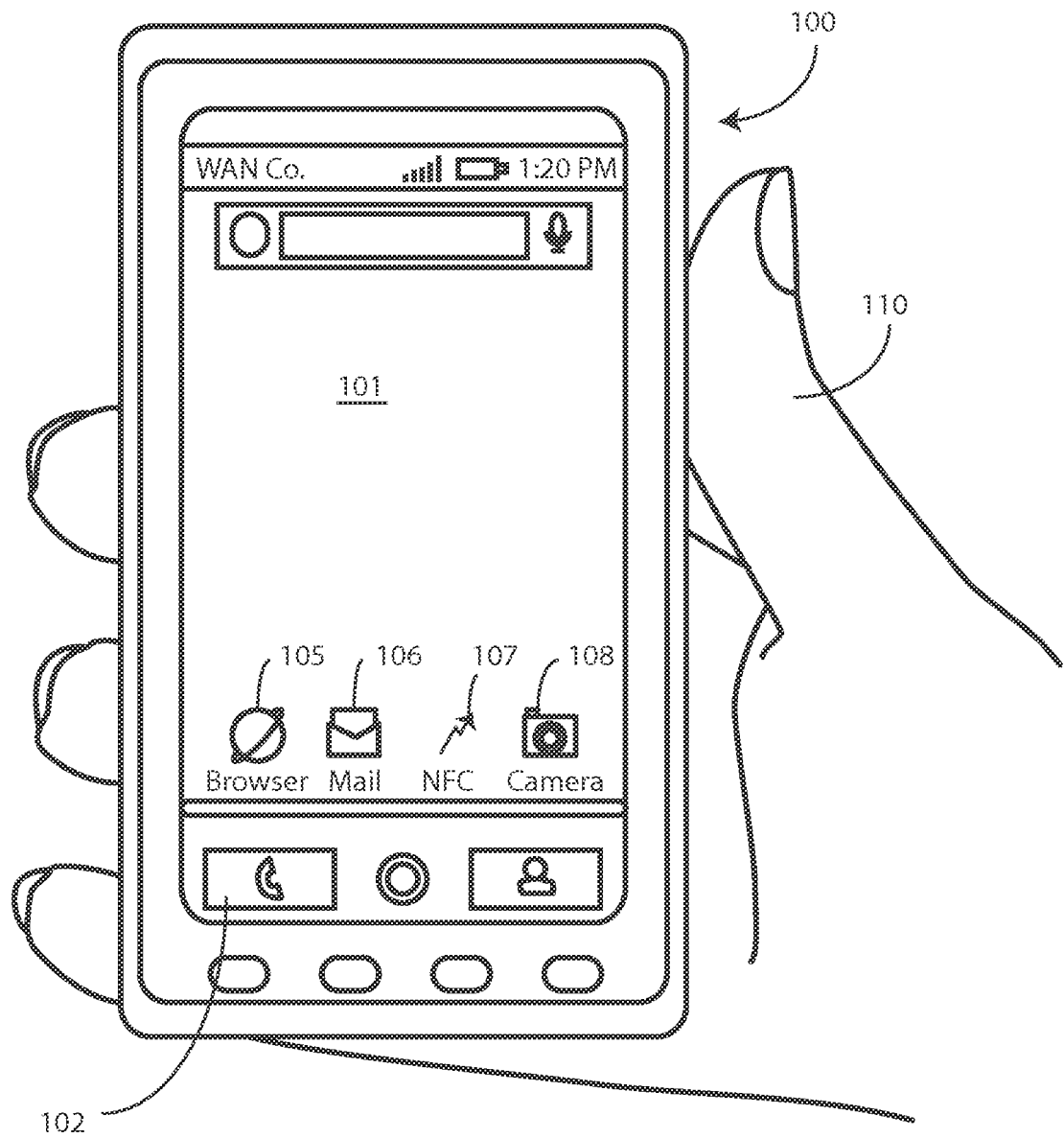
FIG. 1 illustrates an explanatory electronic device in accordance with one or more embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to near field communication through, and optionally data presentation on, a display of an electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of near field communication techniques as described herein. The non-processor circuits may include, but are not limited to, a radio receiver, a radio transmitter, signal drivers, clock circuits, power source circuits, and user input devices. As such, these functions may be interpreted as steps of a method to perform near field communication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device having the communication capabilities with both a near field communication device and with a wide area network. To communicate with the near field communication device, in one embodiment the electronic device includes a near field communication circuit and near field communication antenna. In one embodiment, the near field communication antenna is disposed on a first side of a printed circuit board, while a battery and the wide area network antenna(s) are disposed on the other side of the printed circuit board. Advantageously, disposing the near field communication circuit antenna and the wide area network communication antennas on opposite sides of the printed circuit board increases the separation between the near field communication antenna and the wide area network antenna. In prior art designs, attempts at increasing physical separation between antenna elements requires a reduction in size of near field communication antenna, thereby degrading its performance. This malady is avoided with embodiments of the present invention due to the fact that the printed circuit board and battery physically separate the near field communication antenna from the wide area communication network antenna.

Another advantage offered by embodiments herein involves the "z-stackup." The z-stackup refers to the vertical height from the front surface of the electronic device to the rear surface. With prior art devices, the near field communication circuit antenna is always placed at the back of the device, behind the battery and printed circuit board. This results in an increased Z-dimension stackup height, which corresponds to a thicker overall electronic device. By placing the near field communication circuit antenna between the display and the printed circuit board, and on a side opposite the battery, the z-stackup can be reduced, as the near field communication circuit antenna fills space between the display and the printed circuit board, and eliminates the need for additional z height behind the battery.

A third advantage is that embodiments described below allow any material, such as metal, to be used as the rear housing of the electronic device. In one embodiment, the near field communication circuit antenna is disposed between a display and circuit substrate. When communicating with a near field communication device, the near field communication antenna transmits and receives signals through the display, which is made of glass or plastic. Since the near field communication circuit antenna no longer needs to communicate through the back of the device, the back can be made of metals and other conductive materials. The ability to use metal or other materials offered by embodiments of the present disclosure provides designers with opportunities for designing more durable and aesthetically pleasing electronic devices.

In one embodiment, the electronic device includes a near field communication circuit and a first antenna element. The electronic device also includes a wide area network communication circuit and a corresponding second antenna element. A substrate in the electronic device, which may be a flexible circuit substrate, a printed circuit board, or other substrate, has disposed thereon one or more of the near field communication circuit or the wide area network communication circuit. A battery provides power to the circuits on the substrate. In one embodiment, the first antenna element is disposed on a first side of the substrate, while both the second antenna element and the battery disposed on a second side of the substrate. In one embodiment, the first antenna element is disposed between a display and the substrate, with a circuit connector passing around the first antenna element to electrically connect the display to the circuits on the substrate.

Embodiments of the disclosure, in one embodiment, replace empty space that may reside between the display and the substrate by collocating the near field communication circuit antenna and display on one side of the substrate, while the battery and wide area network antenna are disposed on the other side. Advantageously, this configuration can result in two electrical connectors—one from the substrate to the near field communication circuit antenna and another from the substrate to the display—being combined into a single connector, thereby reducing cost. Moreover, when the two connectors become one, mechanical reliability is increased due to the fact that one less connector is wrapping about an edge of the substrate. This is in addition to the elimination of complicated electrical shielding required in prior art designs.

Yet another advantage offered by embodiments of the disclosure is improved near field communication circuit performance. By disposing the near field communication circuit between the display and the circuit substrate, the size of the near field communication circuit antenna, which is configured as a ferrite and coil assembly in one or more embodiments, is limited in area only by the size of the display. Accordingly, the area of the near field communication circuit antenna can be increased over prior art designs, where proximity to wide area network communication antennas limit its size. This increased size results in improved near field communication performance.

Turning now to FIG. 1, illustrated therein is one embodiment of an electronic device 100 configured in accordance with one or more embodiments of the disclosure. The explanatory electronic device 100 of FIG. 1 is shown as a smart phone for illustrative purposes. However, it will be obvious to those of ordinary skill in the art having the benefit of this disclosure that other electronic devices may be substituted for the explanatory smart phone of FIG. 1. For example, the electronic device 100 may be configured as a palm-top computer, a tablet computer, a gaming device, wearable computer, a media player, or other device.

A user 110 is holding the electronic device 100. The operating system environment, which is configured as executable code operating on one or more processors or control circuits of the electronic device 100, has associated therewith various applications or "apps." Examples of such applications shown in FIG. 1 include a cellular telephone application 102 for making voice telephone calls, a web browsing application 105 configured to allow the user 110 to view webpages on the display 101 of the electronic device 100, an electronic mail application 106 configured to send and receive electronic mail, a near field communication application 107 configured to permit the electronic device 100 to communicate with near field communication object, and a camera application 108 configured to capture still (and optionally video) images. These applications are illustrative only, as others will be obvious to one of ordinary skill in the art having the benefit of this disclosure.

As will be described in more detail with reference to FIGS. 2 and 3 below, in one embodiment the near field communication application 107 is operable with a wireless near field communication transceiver, which in one embodiment is a form of radio-frequency device configured to send and receive radio-frequency data to remote near field communication devices. Using a financial transaction as an illustrative example, the wireless near field communication transceiver may wirelessly communicate with a payment terminal having a near field communication reader. Information such as account number, user, and the like may be transmitted to the payment terminal. Purchase price, purchase location, date stamp, and confirmation number may be transmitted from the payment terminal to the wireless near field communication transceiver.

In addition to operating with devices such as payment terminals, the near field communication application 107 may work with other objects as well. For instance, a smart poster is a poster that includes a near-field communication tag capable of being read by the wireless near field communication transceiver. A smart poster for a movie may include a near field communication tag having information about show times, movie merchandise, and the like. When the user 110 activates the near field communication application 107 and passes the electronic device 100 within a predetermined distance of such a poster, the device may read the information and present corresponding information on the display 101.

Figure 2:
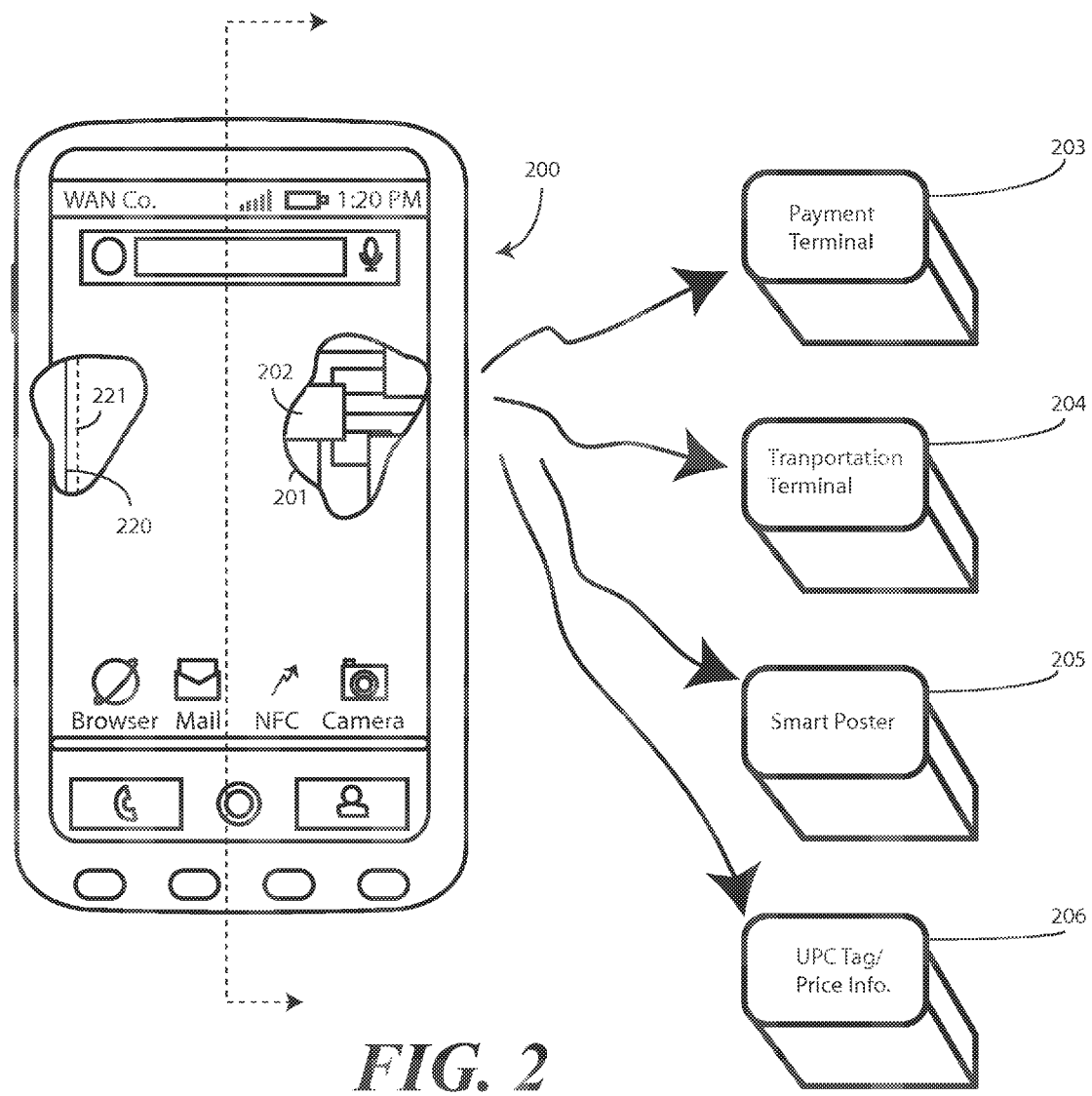
FIG. 2 illustrates an explanatory electronic device in accordance with one or more embodiments.

Turning now to FIG. 2, illustrated therein is one embodiment of a portable electronic device 200 having near field communication capability in accordance with one or more embodiments. Specifically, the portable electronic device 200 includes a near field communication circuit 201 having a near field communication circuit controller 202 coupled thereto. The near field communication circuit controller 202 provides a near field communication interface such that the portable electronic device 200 can wirelessly communicate with a variety of near field communication devices employing various near field communication technologies and protocols. Exemplary near field communication devices include a payment terminal 203, a transportation ticket terminal 204, a smart poster 205, and a RFID tag 206.

The near field communication circuit 201 can include—as an antenna—a communication coil that is configured for near-field communication at a particular communication frequency. In one embodiment, the communication coil is wrapped about a ferrite or other material. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data.

The near field communication circuit controller 202 can be a microprocessor running embedded code, a transceiver integrated circuit, an application specific integrated circuit, an RFID device, or equivalent device. The near field communication circuit controller 202 works to facilitate data communication with other near field communication devices by transmitting data in radio frequency form. One may refer to the publicly available standard at www.ecma-international.org/publications/files/ECMA-ST/Ecma-340.pdf, which is incorporated herein by reference, for more details. Where the near-field communication is RFID communication, for example, this frequency may be about 13.56 MHz as is directed by recognized RFID standards.

Figure 3:
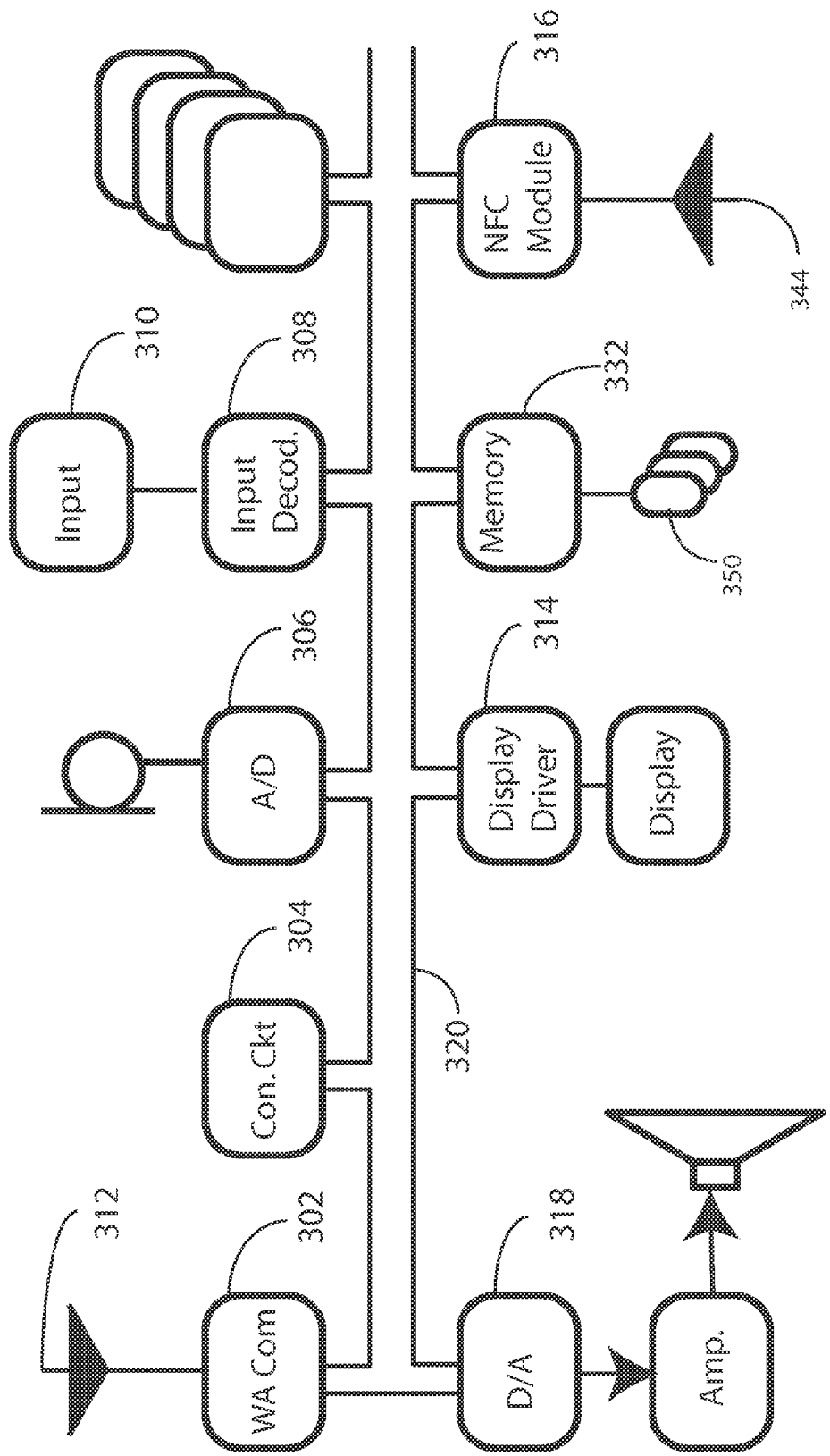
FIG. 3 illustrates a schematic block diagram of a near field communication circuit in accordance with one or more embodiments.

Turning to FIG. 3, illustrated therein is an exemplary schematic block diagram of one electronic device in accordance with one or more embodiments. In one embodiment, the electronic device includes a wide area communication circuit 302 for communication with wide area networks through a wide area communication circuit antenna 312 and a near field communication circuit 316 for communicating with a near field communication circuit antenna 344.

The wide area communication circuit 302 can include wireless communication circuitry, such as one of a receiver, a transmitter, or transceiver. The wide area communication circuit antenna 312 is used for communication with the wide area network. In one embodiment, the wide area communication circuit antenna 312 can comprise two or more antenna elements. Additionally, other antennas can be present in the electronic device, for example for use with GPS circuits.

In one or more embodiments, the wide area communication circuit 302 can be configured for data communication with at least one wide area network. For illustration, the wide area network can be a cellular network being operated by a service provider. Examples of cellular networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. It should be understood that the wide area communication circuit 302 could be configured to communicate with multiple wide area networks as well.

A control circuit 304 is configured for executing the operations of the electronic device. In one embodiment, the control circuit 304 comprises as one or more processors. The control circuit 304 can be a microprocessor, a group of processing components, one or more Application Specific Integrated Circuits (ASICs), programmable logic, or other type of processing device. The control circuit 304 can be operable with the user interface 310, as well as various peripheral ports (not shown) that can be coupled to peripheral hardware devices via interface connections.

The control circuit 304 can be configured to process and execute executable software code to perform the various functions of the electronic device. A storage device, such as memory 332, stores the executable software code used by the control circuit 304 for device operation. The memory 332 may also store identification, configuration, and personalization information suitable for identifying the electronic device or its user.

The executable software code used by the control circuit 304 can be configured as one or more modules 350 that are operable with the control circuit 304. Such modules 350 can comprise instructions, such as control algorithms, that are stored in a computer-readable medium such as the memory 332 described above.

Other standard components can be included, such as an analog to digital converter (A/D) 306, an input decoder 308, a display driver 314, and a digital to analog converter (D/A) 318. The near field communication circuit 316, which will be explained in more detail below, is also shown. Each component is coupled together through a communication bus 320. In one embodiment, the communication bus 320 and the components of FIG. 3 are disposed on a substrate 220, which is shown in FIG. 2. Turning briefly to FIG. 2, in one embodiment, the substrate 220 comprises a printed circuit board. In another embodiment, the substrate 220 comprises a flexible circuit substrate. In one or more embodiments, the substrate 220 includes a ground plane 221 spanning one or more portions of the substrate 220. The components of FIG. 3 can be embodied in the electrical circuit components and interconnections disposed along the substrate in one or more embodiments.

Figure 4:
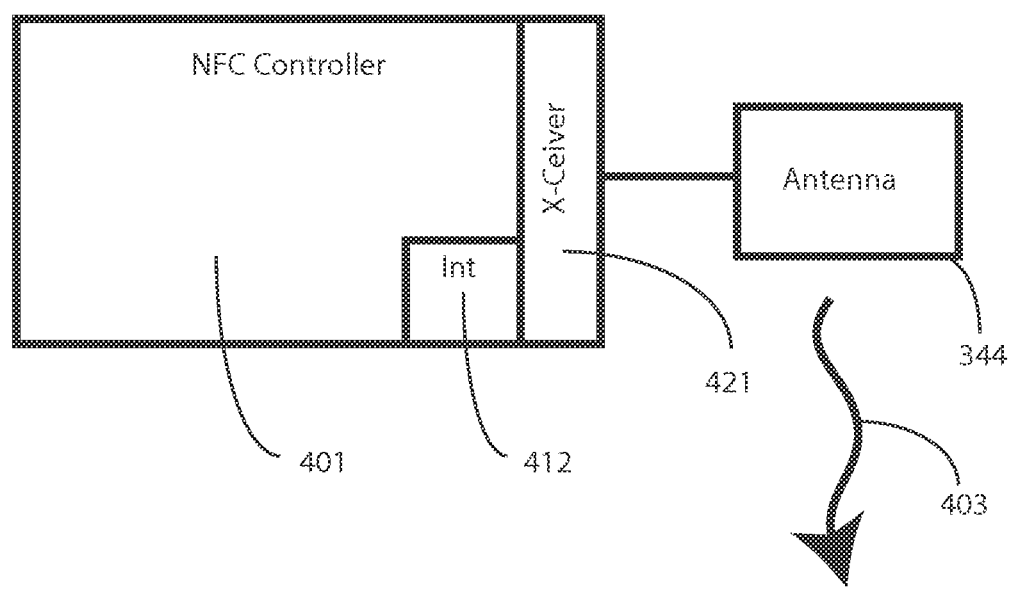
FIG. 4 illustrates a schematic block diagram of an explanatory electronic device in accordance with one or more embodiments.

Turning now to FIG. 4, illustrated therein is one embodiment of a near field communication circuit in accordance with one or more embodiments. A near field communication circuit controller 401, which may be a microprocessor, application specific integrated circuit, or other similar device, is configured to facilitate near field communication with external near field communication devices. The near field communication circuit controller 401 is coupled to a near field communication circuit antenna 344, which may be embodied in a coil disposed on a printed circuit board or other substrate.

Communication signals 403 are transmitted and received through the near field communication circuit antenna 344. The near field communication circuit controller 401 communicates by way of a near field communication transceiver 421.

The near field communication circuit controller 401 can be configured to identify a near field communication technology, a data protocol, and an identifier associated with a remote near field communication device. The near field communication circuit controller 401 can identify this information from the communication signals 403 received from the remote near field communication device.

The near field communication circuit controller 401, in one embodiment, is capable of communication with a wide variety of near field communication technologies and devices. The near field communication circuit controller 401 accomplishes this by emulating a single near field communication circuit interface 412 when communicating with remote near field communication devices. As such, a near field communication circuit interface 412 can be configured as a near field communication card or reader, depending upon mode, to the external near field communication device.

As noted above, the near field communication circuit can be capable of communication with a variety of near field communication technologies. For instance the near field communication circuit interface 412, in one embodiment, is capable of emulating near field communication application execution in accordance with the timing requirements defined by ISO/IEC 14444-3 and NFCIP standard. Further, the near field communication circuit interface 412 may be configured to support other legacy applications such as Mifare, Felica, and others.

Figure 5:
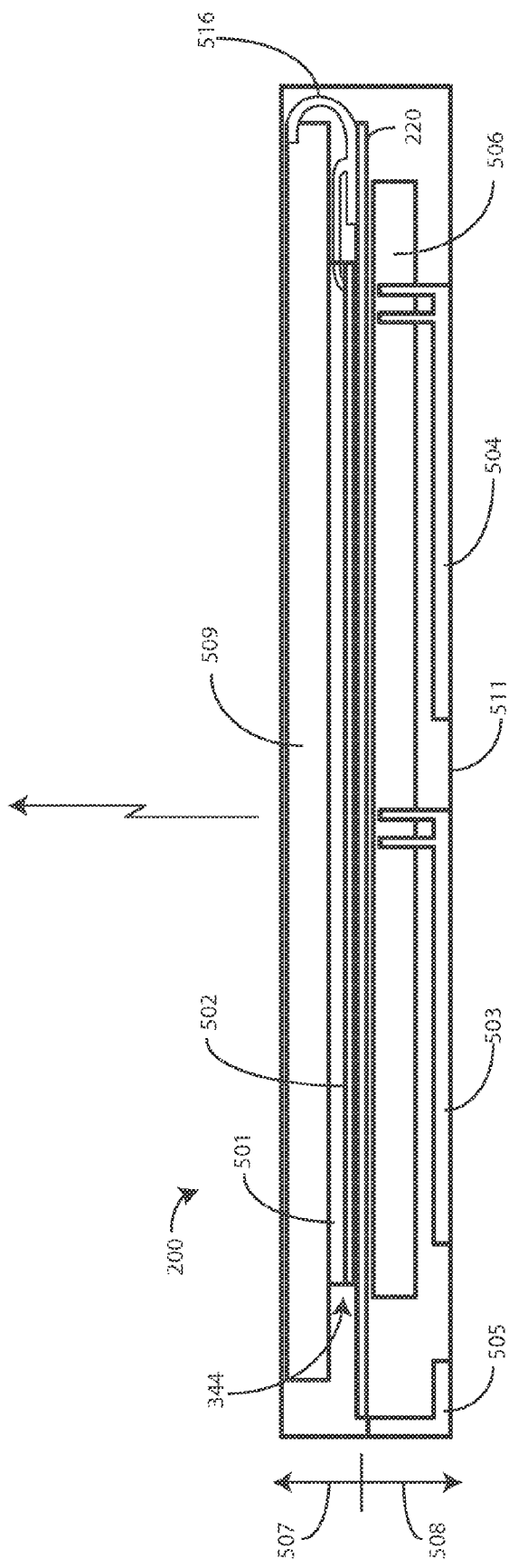
FIG. 5 illustrates a sectional view of the explanatory electronic device of FIG. 2 taken along the section line shown in FIG. 2.

Turning now to FIG. 5, illustrated therein is the electronic device 200 of FIG. 2 shown in a sectional view, with the section being taken along the sectional line shown in FIG. 2. As noted above, in one embodiment the electronic device 200 a near field communication circuit (201) that is operable with a near field communication circuit antenna 344. In one embodiment, the near field communication circuit antenna 344 comprises a ferrite 501 and a coil. As also noted above, the electronic device 200 can include a wide area communication circuit (302) operable with a wide area communication circuit antenna (312). In this illustrative embodiment, the wide area communication circuit antenna (312) comprises two antennas 503,504. The electronic device 200 of this illustrative embodiment also includes a GPS antenna 505 operable with a navigation circuit.

In one embodiment, one or both the near field communication circuit (201) and the wide area communication circuit (302) are disposed on the substrate 220, which in this illustrative embodiment is a printed circuit board. A battery 506 is electrically coupled to the substrate 220 to provide power to the electrical components disposed on the substrate 220.

As shown in this explanatory embodiment, the near field communication circuit antenna 344 is disposed on a first side 507 of the substrate 220, while both the battery 506 and the wide area communication circuit antennas 503,504 are disposed on a second side 508 of the substrate 220. In this illustrative embodiment, the battery 506 is disposed between the substrate 220 and the wide area communication circuit antennas 503,504. This arrangement places the near field communication circuit antenna 344 between the substrate 220 and the display 509 of the electronic device 200. Accordingly, the near field communication circuit (201) employs the near field communication circuit antenna 344 to communicate through remote devices through the display 509.

An electrical connector 516, which is configured as a flexible circuit substrate in this embodiment, electrically couples the display 509 to the substrate 220. In one embodiment, a single electrical connector 516 can be used to couple both the display 509 and the near field communication circuit antenna 344 to the substrate 220. This is the case in FIG. 5. Had the near field communication circuit antenna 344 been placed between the rear housing 511 and the battery 506, as is the case in prior art designs, two electrical connectors would have been required. Not only does this increase cost by adding an additional connector, but it reduces mechanical reliability, as one of the connectors has to wrap about the substrate 220. Friction between the substrate 220 and this second electrical connector can lead to mechanical and electrical failure.

Additionally, had the near field communication circuit antenna 344 been placed between the rear housing 511 and the battery 506, as is the case in prior art designs, there is a requirement to compromise between near field communication circuit antenna performance and wide area antenna performance due to the close proximity of the two radiating elements. Making the near field communication circuit antenna 344 larger improves its performance. However, this larger size causes it to be positioned closer to the wide area communication circuit antennas 503,504, and thus degrades the wide area network antenna performance. To maintain acceptable wide area network antenna performance, the radiating area of the near field communication circuit antenna 344 and performance in prior art designs must be reduced. By disposing the near field communication circuit antenna 344 between the substrate 220 and the display 509, such that the substrate 220 separates the near field communication circuit antenna 344 from the battery 506 and the wide area communication circuit antennas 503,504, we can maintain acceptable wide area network antenna performance and can have a larger radiating area at the near field communication circuit antenna 344. A larger radiating area, achieved by placing the near field communication circuit antenna 344 between the substrate 220 and the display 509, results in more reliable and robust near field communication characteristics compared to a smaller radiating areas, such as those required by prior art designs where all antennas are placed between the rear housing 511 and the battery 506.

Figure 6:
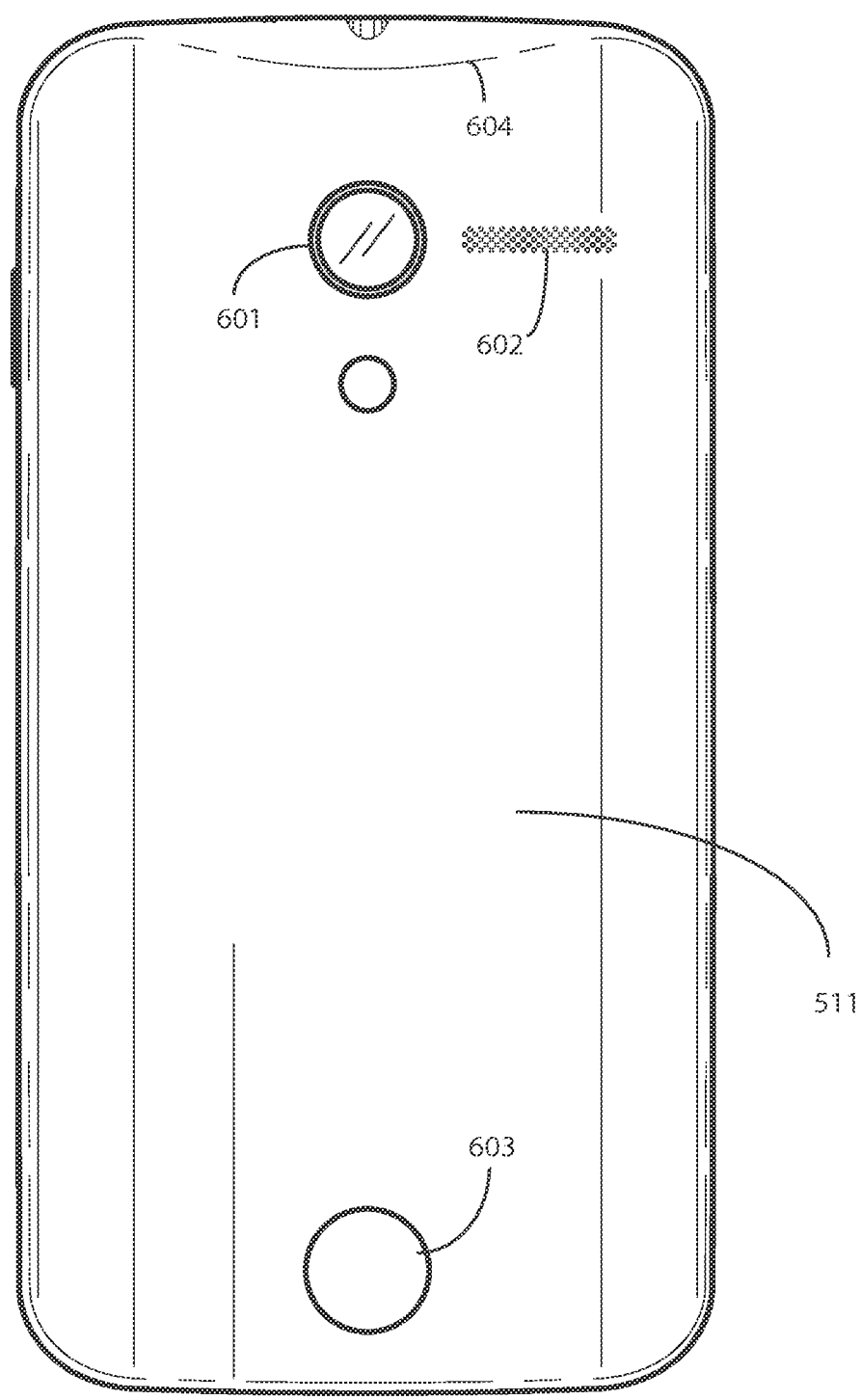
FIG. 6 illustrates a rear face of an electronic device in accordance with one or more embodiments.

The fact that the near field communication circuit antenna 344 communicates through the display 509 of the electronic device 200 offers yet another advantage. In the embodiment of FIG. 5, the display 509 defines a first major face of the electronic device 200, and the rear housing 511 or rear housing element defines a second major face of the electronic device. Since the need for near field communication through the rear housing 511 is eliminated, the rear housing 511 can be manufactured from electrically conductive materials such as metal. As shown in FIG. 6, this allows the rear housing 511 to be curved 604 and take on contours that are not possible when reinforced glass or other non-conductive materials are used. Moreover, using a material like metal makes it possible to accommodate additional features along the rear housing 511 such as a camera 601, loudspeaker 602, or customized logos 603.

Figure 7:
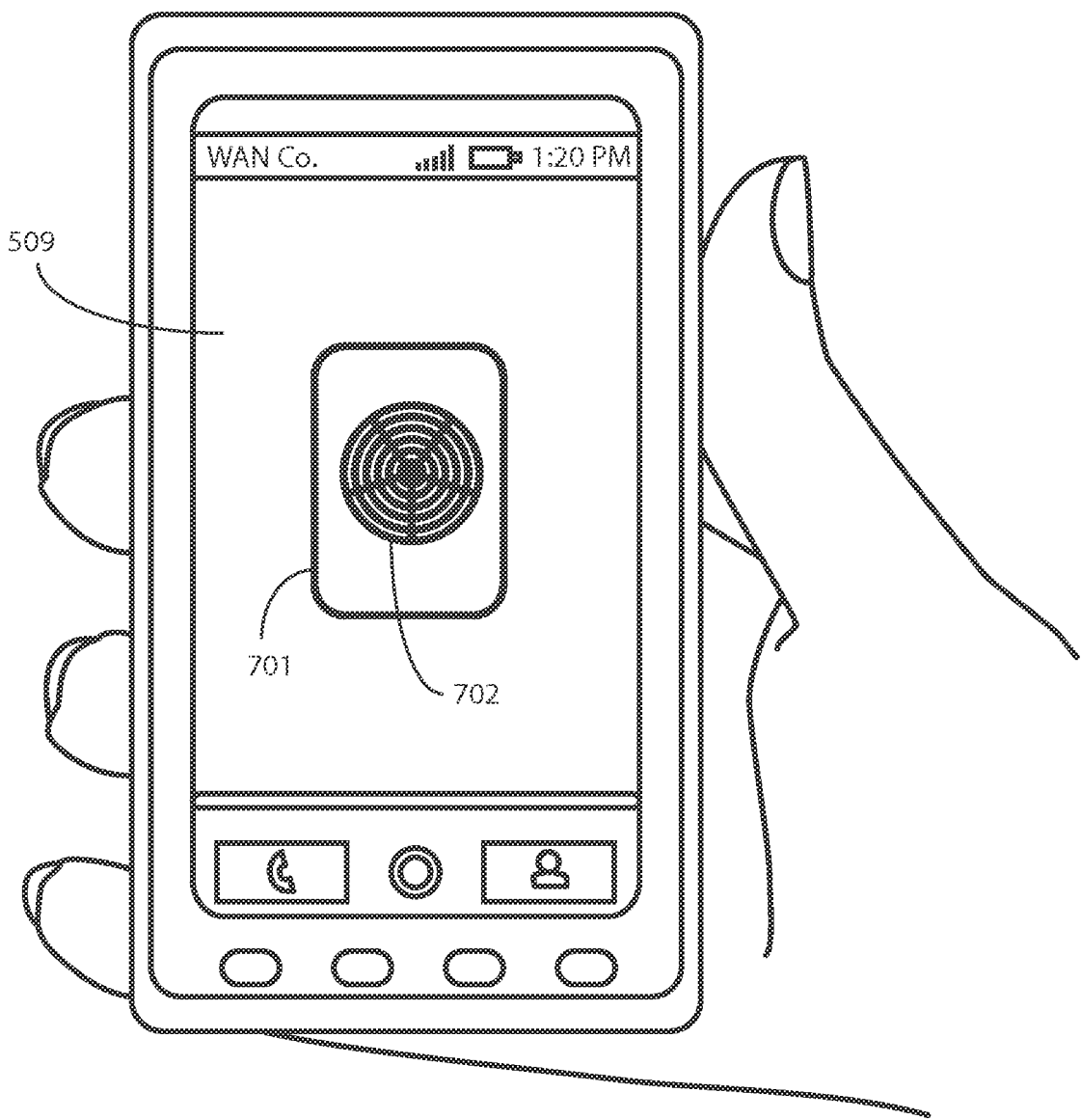
FIG. 7 illustrates an explanatory electronic device in accordance with one or more embodiments.
Figure 8:
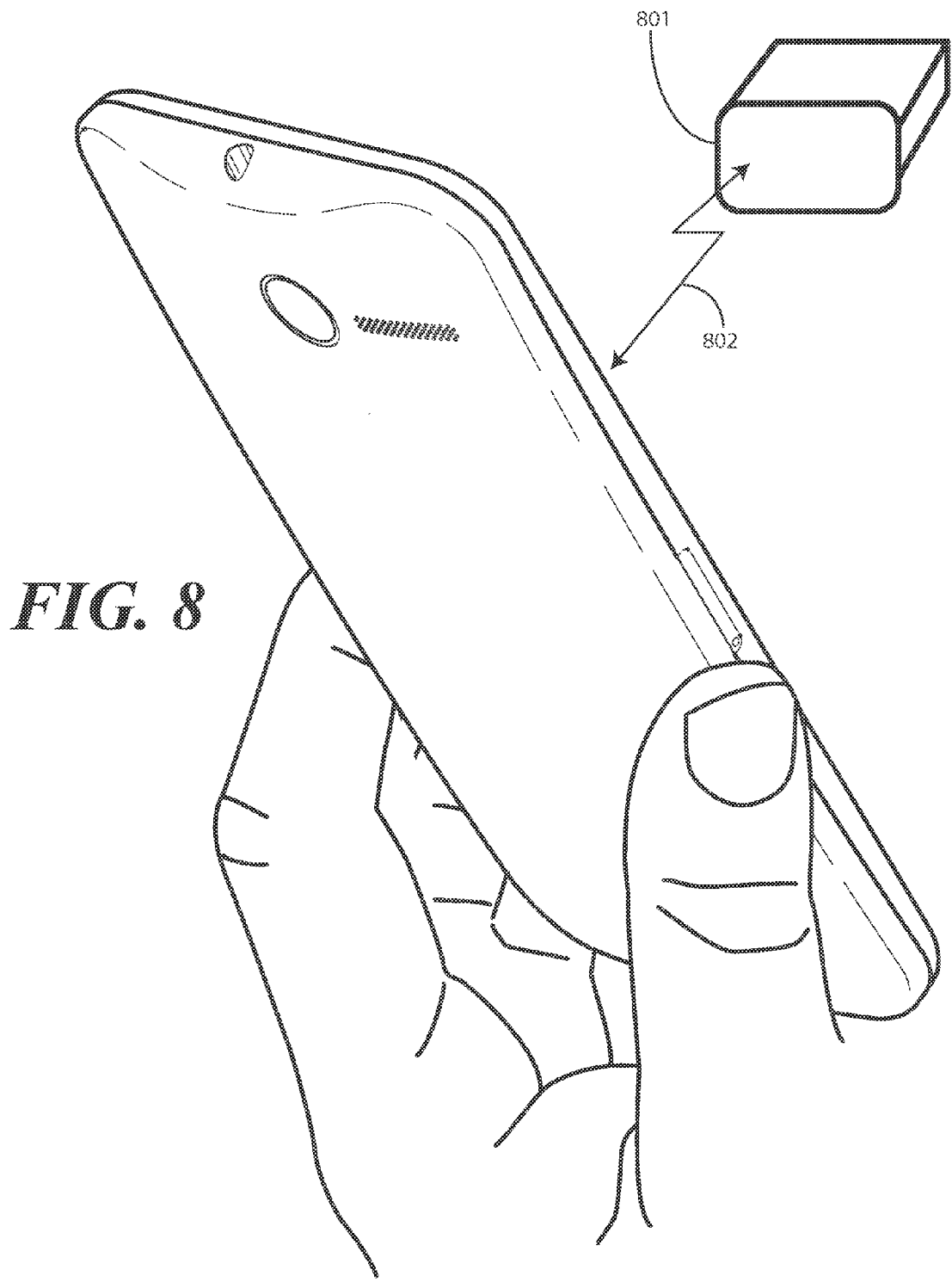
FIG. 8 illustrates an explanatory electronic device in accordance with one or more embodiments.

Turning now to FIG. 7, since near field communication occurs through the display 509 in one or more embodiments, in one embodiment the control circuit (304) can be configured to present indicia 701 on the display to assist the user in optimally using the near field communication circuit (316). In this illustrative embodiment, the control circuit (304) is configured to present a near field communication circuit antenna emission indicator 702 on the display 509. In one embodiment, the near field communication circuit antenna emission indicator 702 corresponds to a portion of the display through which near field communication signals pass. By aiming the near field communication circuit antenna emission indicator 702 at an external near field communication device, efficient communication can occur. Turning to FIG. 8, the user 110 is shown aiming the near field communication circuit antenna emission indicator (702) at a near field communication device 801. Near field communication signals 802, which in one embodiment are directed through the near field communication circuit antenna emission indicator (702) are then transmitted to the near field communication device 801.

Figure 9:
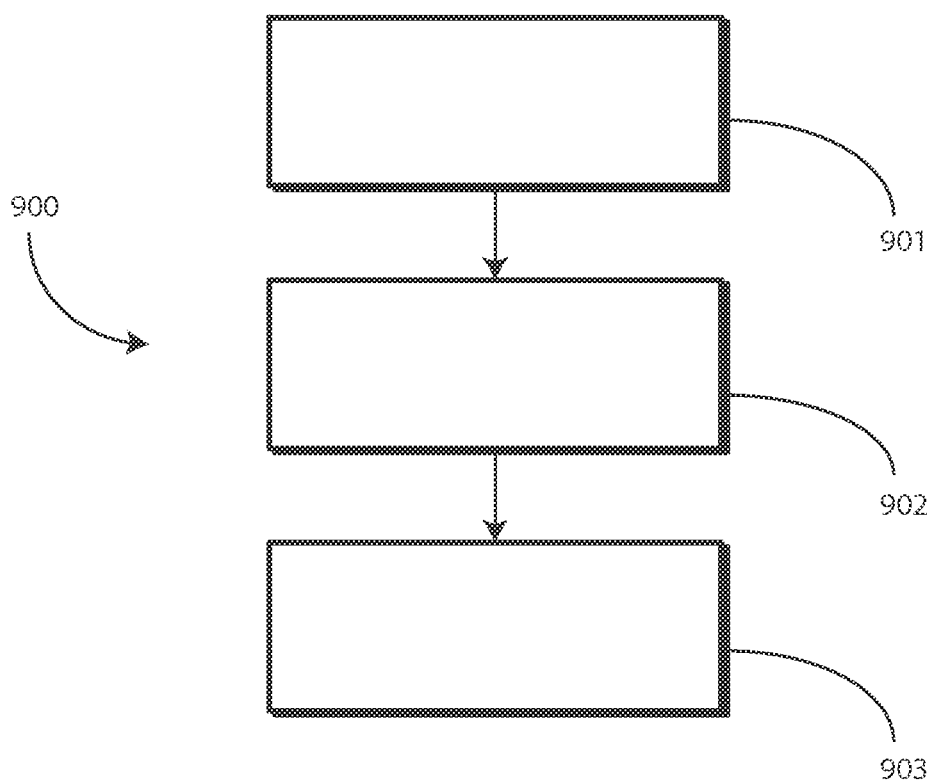
FIG. 9 illustrates an explanatory method of manufacturing an electronic device in accordance with one or more embodiments.

Turning to FIG. 9, illustrated therein is one embodiment of a method 900 for manufacturing an electronic device in accordance with one or more embodiments. At step 901, the components of the electronic device are provided. In one embodiment, these components include a circuit substrate. The circuit substrate can have a control circuit disposed thereon. In one or more embodiments, the circuit substrate includes a near field communication circuit and a wide area communication circuit as well. Step 901 can also include providing a display, a battery, a near field communication circuit antenna, and a wide area communication circuit antenna.

At step 902, the components are arranged within a housing element. In one embodiment, the components are arranged such that the circuit substrate separates the near field communication circuit antenna from the wide area communication circuit antenna. In one embodiment, the circuit substrate also separates the near field communication circuit antenna from the battery as well. At step 903, when all the components are disposed within the housing element, a display is coupled to the housing so as to define a second major face of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while embodiments above describe a near field communication circuit being disposed between the display and a substrate, a wireless charging circuit could be similarly situated so as to couple to a wireless charger through the display. Such an embodiment would allow charging through the display while wireless communication occurs through other major faces of the display. Moreover, in one or more embodiments both the near field communication circuit and the wireless charging circuit can be placed behind the display such that either near field communication or wireless charging could occur through the display. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
 a display;
 a near field communication circuit comprising a first antenna element;
 a wide area network communication circuit comprising a second antenna element;
 a substrate, wherein one or more of the near field communication circuit or the wide area network communication circuit is disposed on the substrate; and
 a battery to provide power to the substrate, wherein:
  the first antenna element is disposed on a first side of the substrate,
  both the second antenna element and the battery are disposed on a second side of the substrate different from the first side of the substrate,
  the battery is disposed between the second antenna element and the substrate, and
  the first antenna element is disposed between the display and the first side of the substrate, and
 wherein the display is configured to display a graphical emission indicator at a location of the display corresponding to a portion of the display associated with the first antenna.

2. The electronic device of claim 1, the first antenna element to communicate with a remote device through the display.

3. The electronic device of claim 2, the substrate comprising a printed circuit board.

4. The electronic device of claim 2, further comprising an electrical connector coupling the display to circuitry disposed on the substrate, the electrical connector passing about a side edge of the first antenna element.

5. The electronic device of claim 1, the display defining a first major face of the electronic device, further comprising a rear housing element defining a second major face of the electronic device, the rear housing element being manufactured from metal.

6. The electronic device of claim 1, the substrate comprising a ground plane defining a shield disposed between the first antenna element and the second antenna element.

7. An electronic device, comprising:
 a control circuit disposed on a circuit substrate;
 a display operable with the control circuit;
 a battery to power the electronic device;
 a near field communication antenna; and
 a wide area network communication antenna, wherein:
  the circuit substrate separates the near field communication antenna from the battery and the wide area network communication antenna,
  the near field communication antenna is disposed between the circuit substrate and the display, and
  the battery is disposed between the wide area network communication antenna and the circuit substrate, and
 wherein the display is configured to display a graphical emission indicator at a location of the display corresponding to a portion of the display associated with the near field communication antenna.

8. The electronic device of claim 7, further comprising an electrical connector passing about the near field communication antenna to couple the display to the circuit substrate.

9. The electronic device of claim 7, the near field communication antenna and the wide area network communication antenna disposed in a housing, the housing being metal.

10. The electronic device of claim 7, the circuit substrate comprising a printed circuit board.

11. The electronic device of claim 10, the printed circuit board comprising an electrically conductive layer to shield the near field communication antenna from the wide area network communication antenna.

12. The electronic device of claim 7, the near field communication antenna comprising a ferrite and a coil.

* * * * *